(12) United States Patent
Lee et al.

(10) Patent No.: US 8,752,075 B1
(45) Date of Patent: Jun. 10, 2014

(54) METHOD FOR DATA TRANSPORT

(71) Applicant: Xilinx, Inc., San Jose, CA (US)

(72) Inventors: Chong M. Lee, Broomfield, CO (US);
David L. Kreymer, Seattle, WA (US);
Ian L. McEwen, Golden, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/777,660

(22) Filed: Feb. 26, 2013

(51) Int. Cl.
*G06F 3/00* (2006.01)
*G06F 15/16* (2006.01)

(52) U.S. Cl.
USPC ............................ 719/328; 709/203; 719/320

(58) Field of Classification Search
None
See application file for complete search history.

(56) References Cited

U.S. PATENT DOCUMENTS

| | | | |
|---|---|---|---|
| 2002/0038451 A1* | 3/2002 | Tanner et al. | 717/105 |
| 2004/0123306 A1* | 6/2004 | Gazda et al. | 719/328 |
| 2006/0150200 A1* | 7/2006 | Cohen et al. | 719/328 |
| 2006/0195508 A1* | 8/2006 | Bernardin et al. | 709/203 |
| 2009/0235282 A1* | 9/2009 | Meijer et al. | 719/320 |
| 2010/0162275 A1* | 6/2010 | Bradley et al. | 719/328 |

OTHER PUBLICATIONS

"Delimited Control in OCaml, Abstractly and Concretely", Kiselyov, 2012, pp. 1-46.*

"Teaching Eralng using Robotics and Players/Stage", Gruner, 2009, pp. 1-8.*
U.S. Appl. No. 13/777,798, filed Feb. 26, 2013, Lee.
Google Inc., *Developer Guide, Overview*, last updated Apr. 2, 2012, downloaded Dec. 12, 2012, pp. 1-3, available from Google Inc. at <https://developers.google.com/protocol-buffers/docs/overview>.
Swig, *Executive Summary*, last modified Mar. 10, 2009, downloaded Dec. 12, 2012, pp. 1-2, available at <http://www.swig.org/exec.html>.
Wikipedia, *Base64*, last modified Nov. 27, 2012, downloaded Dec. 13, 2012, pp. 1-10, available from Wikipedia at <http://en.wikipedia.org/wiki/Base64>.
Wikipedia, *Protocol Buffers*, last modified Nov. 16, 2012, downloaded Dec. 13, 2012, pp. 1-3, available from Wikipedia at <http://en.wikipedia.org/wiki/Protocol_Buffers>.

* cited by examiner

*Primary Examiner* — Tuan Dao
(74) *Attorney, Agent, or Firm* — LeRoy D. Maunu; Lois D. Cartier

(57) ABSTRACT

A method is provided for communicating data between a first process and a second process. A set of inter-process functions of the first and second processes is determined. The set includes one or more functions of the first and second processes that are accessible by the other one of the first and second processes. An API definition file is generated. The API definition file includes a plurality of objects that each define a request to execute one or more inter-process functions of the set of inter-process functions. In response to input to the first process indicating a plurality of the inter-process functions, the plurality of inter-process functions are serialized according to the API definition file. The serialized set of functions is provided to the second process, using an FFI process, and deserialized according to the API definition file.

19 Claims, 3 Drawing Sheets

US 8,752,075 B1

METHOD FOR DATA TRANSPORT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The disclosure generally relates to the communication of data between processes of an application.

BACKGROUND

Computing systems may be developed and organized in a number of ways. In some applications, different components of a system may be developed using different programming languages (e.g., C, C++, Perl, Python, Java, and Tcl) that are particularly suited to the functions performed by the respective system components. Efficient communication of data between processes written in different languages can be difficult because the languages may not provide a mechanism to communicate data with processes written in other languages.

As an illustrative example, in the field of circuit design, computer-aided design (CAD) tools provide a mechanism for users to quickly visualize, connect, and modify circuits using a graphical user interface (GUI). Using CAD tools, circuit designs can be assembled using a GUI, translated into a hardware description language (e.g., HDL and VHDL), and synthesized into hardware configuration data. Some CAD tools used for circuit design also provide a mechanism for simulation and debugging of circuit designs. CAD tools generally include a modeling process that maintains a data representation of the objects and connections of a circuit design and a separate GUI process that renders objects of the circuit design for display to a user. In some CAD tools, the GUI process is written in Java, which includes a number of libraries for graphical display of objects, while the modeling process is written in C++, which can perform computational tasks more efficiently. As indicated above, the use of multiple programming languages poses a challenge for communication of data between the modeling process and the GUI.

One approach for communication between processes of a CAD tool uses a foreign function interface (FFI) to communicate individual data transactions between a Java GUI process and a C++ modeling process. An FFI is a mechanism by which a process written in one programming language can invoke functions or make use of services of another process written in another programming language (e.g., functions provided by an operating system or software library). FFI code for communication of data transactions between the processes may be generated using the Simplified Wrapper and Interface Generator (SWIG). SWIG is a tool for generation of an FFI for communication between C/C++ functions and other languages (e.g., Java, Python, Perl, or Tcl). Although use of FFIs in this approach allows a Java GUI process and C++ modeling process to exchange individual data transactions, a very large number of transactions are initiated in the normal operation of the CAD tool.

SUMMARY

A method is provided for communicating data between first and second processes. A set of inter-process functions of the first and second process is determined. The set includes one or more functions of the first and second processes that are accessible by the other one of the first and second processes. A first application program interface (API) definition file is generated. The API definition file includes a plurality of objects. Each object represents a request to execute one or more of the set of inter-process functions. In response to user input indicating a plurality of inter-process functions of the set of inter-process functions, the first process is used to serialize the plurality of inter-process functions according to the API definition file. The serialized set of functions is provided to the second process using an FFI. Using the second process, the serialized set of functions is deserialized according to the API definition file, to retrieve the plurality of the set of inter-process functions. The plurality of the set of inter-process functions are executed by the second process.

A system is also provided, in which a processor is configured to determine a set of inter-process functions of a first process and a second process. The set includes one or more functions of the first and second processes that are accessible by the other one of the first and second processes. The first process is written in a first high-level programming language and the second process is written in a second high-level programming language. The processor is configured to generate an API definition file including a plurality of objects. Each object defines a request to execute one or more of the set of inter-process functions. The processor is configured to, in response to input indicating a plurality of the set of inter-process functions, use the first process to serialize the plurality of the set of inter-process functions according to the API definition file. The processor is further configured to use an FFI process to provide the serialized set of functions to the second process. The processor is further configured to use the second process on the programmed processor to deserialize the serialized set of functions according to the API definition file and execute the deserialized set of inter-process functions.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Figure 1:
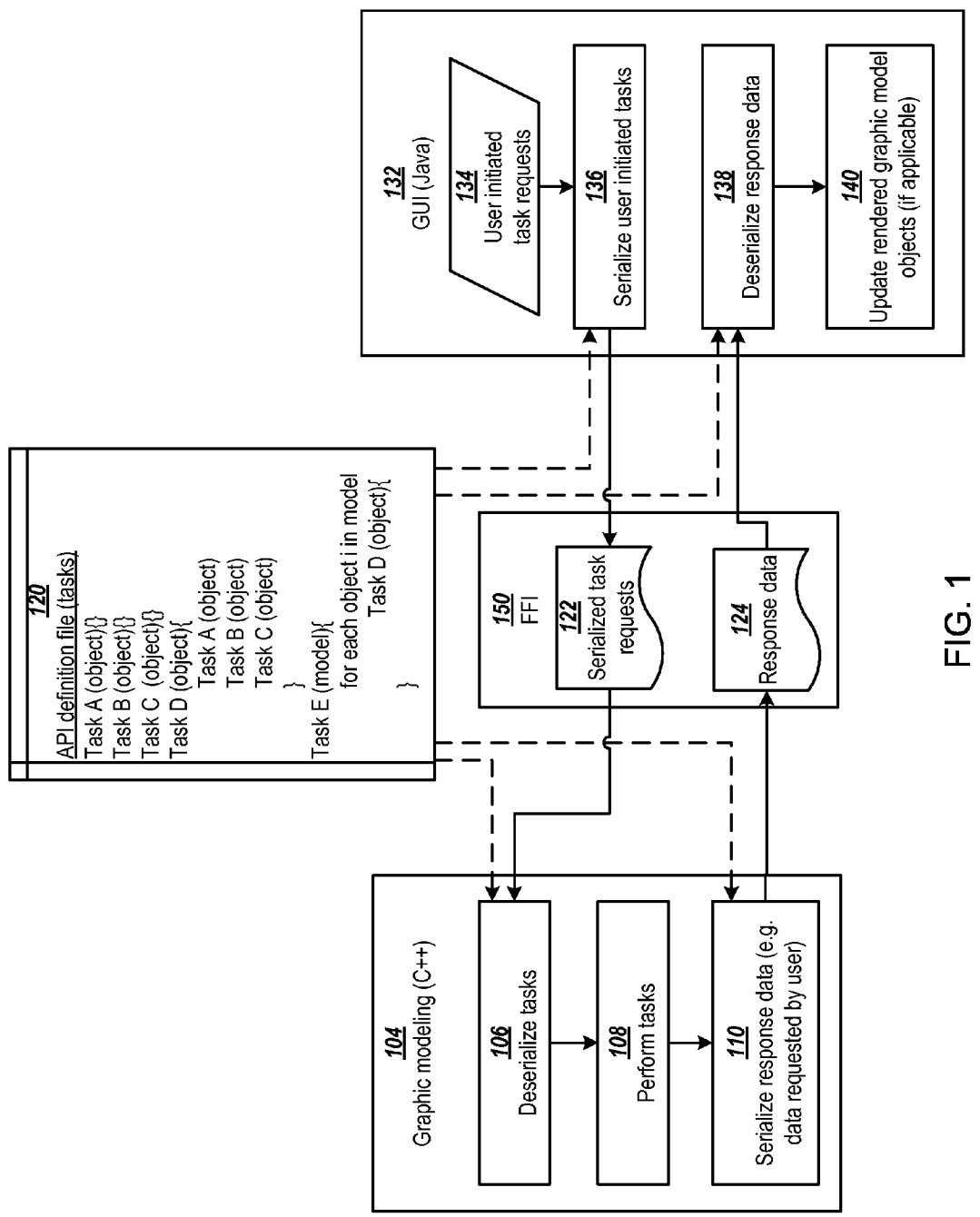
FIG. 1 shows a flowchart for communication of data transactions between a GUI process and a graphics modeling process.

Methods and circuits are disclosed for the communication of data between processes written in different programming languages. Various examples are applicable to a variety of applications in which data is communicated between processes written in different programming languages. While the invention is not so limited, for ease of explanation, the examples herein are primarily described with reference to communication of data between a C++ graphics modeling process and a Java GUI process of a CAD tool. Some CAD tools use an FFI (e.g., generated by SWIG) to communicate each individual data transaction between the Java GUI process and the C++ modeling process of the CAD tool. However, due to the large number of transactions initiated in the normal operation of the CAD tool, communication of individual data transaction using an FFI can create a bottleneck.

A mechanism for efficient communication of data transactions between a Java GUI process and the C++ modeling process of the CAD tool is described in this disclosure. Data transactions may include, for example, communication of function calls to initiate tasks of a process or communication of data objects (e.g., graphic objects) between the processes. Data transactions are communicated between the Java GUI process and the C++ modeling process as serialized sets of data transactions. A set of data transactions to be communicated from a first process is serialized according to an API definition file and communicated to the second process using an FFI. The serialized set of data transactions received by the second process are deserialized according to the API definition file to produce a deserialized set of the data transactions that may be processed by the second process. This methodology improves runtime performance by reducing the amount of data that is required to be communicated and reducing the number of data transactions used to communicate the data.

Serialization and deserialization of the data transactions may be performed according to a protocol buffer API definition file (e.g., a .proto file). Protocol buffers are a language-neutral, platform-neutral, extensible mechanism that may be used to serialize structured data in communications protocols. One or more protocol messages are defined to specify how information is to be structured. Each protocol message can include a set of name-value pairs, and each name-value pair includes a name and a value type. A value type may be a number (e.g., an integer or a floating-point), a Boolean, a string, raw bytes, and the like. In addition, value types can also include other protocol messages. Accordingly, protocol buffers enable information to be structured hierarchically.

Once protocol messages are defined, the definitions can be run through a protocol buffer compiler to automatically generate data access mechanisms and serialization/deserialization mechanisms. The mechanisms are configured to convert a protocol message object (e.g., a set of data transactions) into a protocol buffer (e.g., raw bytes) for serialization, and to convert the protocol buffer into the protocol message object for deserialization. The data access mechanisms facilitate communication of data using the name-value pairs defined by the protocol messages.

Turning now to the figures, FIG. 1 shows a flowchart for communication of data transactions between a GUI process and a graphics modeling process. GUI 132 provides an interface through which a user may initiate a set of task requests 134 (e.g., add/remove/modify circuit elements, modify layout, modify display, perform simulation, and display debugging signals). The user initiated task requests 134 are serialized at block 136 according to API definition file 120.

In this example, the API definition file 120 includes objects defining three elemental function calls (tasks A, B, and C) and two macro function calls (tasks D and E). For example, if the set of user initiated tasks 134 includes a function call for task A, the function call may be serialized by replacing the function call with a corresponding object from the API definition file 120. As another example, if the set of user initiated tasks 134 includes function calls for tasks A, B, and C, the function calls may be serialized by replacing the function calls with a single object in the API definition file 120 corresponding to task D macro.

As yet another example, macro function call task E represents a request to execute task D for each object "i" in a circuit design model. If the set of user initiated tasks 134 includes function calls (tasks A, B, and C) to be performed for multiple objects in the circuit design model, all of these function calls may replaced with the single object in the API definition file 120 corresponding to the task E macro. As multiple function calls can be represented by a call to a task macro in serialized form, the number of data transactions needed to communicate the set of task requests is reduced. Serialized task requests 122 are communicated from the GUI 132 to a graphics modeling process 104 using an FFI 150. The graphics modeling process 104 is configured to deserialize the serialized task requests 122 at block 106. The graphics modeling process 104 performs the tasks indicated by the deserialized task requests at block 108. If the tasks generate any data responses (e.g., data requested by a user), the data responses are serialized at block 110. For example, a user generated task may request that debugging information for a particular set of signals be displayed. In such case, graphical data representing the set of signals would be returned. Serialized response data 124 is communicated to the GUI 132. In response to receiving serialized response data 124, the GUI deserializes the response data at block 138. If applicable, the GUI uses the deserialized data to update the rendered graphics model at block 140.

Examples 1 and 2 show example code that may be used for serialization and deserialization of messages according to the API definition file 120. Example 1 shows example Java code that may be used in an implementation of the GUI 132 for serialization and deserialization messages according to the API definition file 120. Example 2 shows example C++ code that may be used in an implementation of the graphics modeling process 104 for serialization and deserialization according to the API definition file 120.

```
/* Copyright XILINX 2013*/
private HART.RouteData_processRouteDataInfo( ){
    //1. Serialize the task requests into a byte array.
    //2. Process the task requests.
    //3. Return the size of the protocol buffer.
    final byte[ ] inBytes=m_builder.build( ).toByteArray( );
    int size=(int) fedi.RouteApi_getRouteInfoSize (m_cPtr,
        inBytes, inBytes.length);
    if (size<=0)
        return null;
    //4. Allocate memory for the response data.
    //5. Call C++ engine to serialize the response data into the
        byte array.
    byte[ ] retBuf=new byte[size+1];
    fedi.RouteApi_getRouteInfoByteArray(m_cPtr,  retBuf,
        size);
    //6. Deserialize the response data.
    final                          HART.RouteData.Builder
        builderRet=HART.RouteData.newBuilder( );
    return builderRet.mergeFrom(retBuf, 0, size).build( );
}
```

EXAMPLE 1

```
void HFEDRouteGuiApi::getRouteInfoByteArray(unsigned
char* BYTE, int buffLen) const
{
    //Serialize the response data into the byte array.
    //The byte array memory is allocated according to the
    //return value in the above getRouteInfoSize function.
    const                     ::google::protobut::Message*
        pbMsg=dynamic_cast<const    ::google::protobutMes-
        sage*>(&m_routeInfo);
    pbMsg→SerializeToArray(BYTE, buffLen);
}
```

EXAMPLE 2

Figure 2:
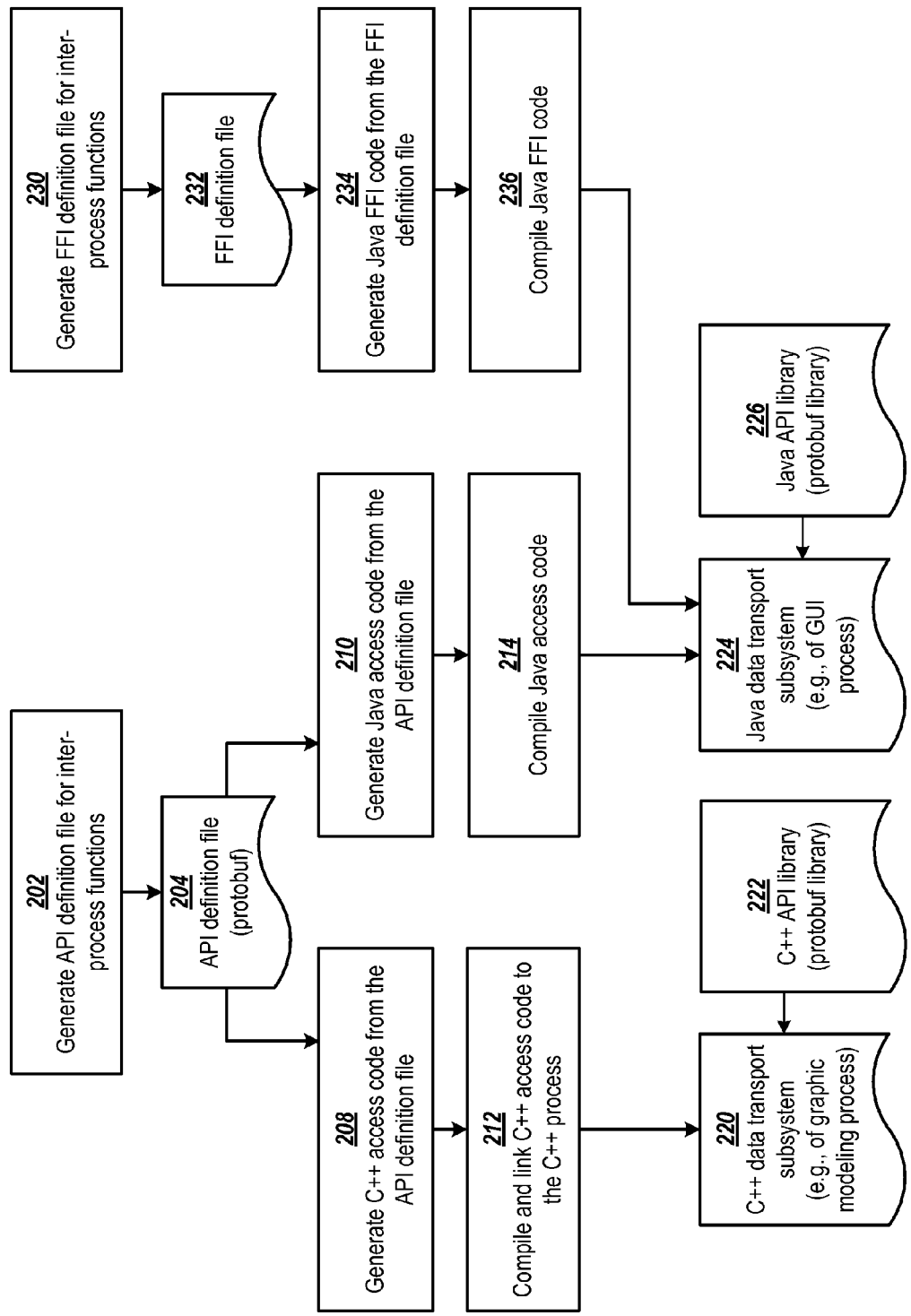
FIG. 2 shows a method for generating sub-system code for data transport between a C++ data transport sub-system and a Java data transport sub-system.

FIG. 2 shows a method for generating sub-system code for data transport between a C++ data transport sub-system (e.g., the C++ graphics modeling process 104) and a Java data transport sub-system (e.g., the Java GUI process 132). At block 202, an API definition file 204 is generated for inter-process functions of the C++ and Java data transport sub-systems. Inter-process functions of the C++ sub-system are those that are called by the Java sub-system. Similarly, inter-process functions of the Java sub-system are those that are called by the C++ sub-system. To generate the API definition file, code of the C++ and Java sub-systems is traversed to determine a set of inter-process functions. After determining the set of inter-process functions, objects are created in the API definition file 204 to represent function calls to the inter-process functions.

Java access code for the inter-process functions is generated from the API definition file 204 at block 210. The Java access code is compiled at block 214. The compiled Java access code is added to the Java sub-system 224 and allows the sub-system to communicate data using functions in a Java API library 226 and objects defined in the API definition file 204. As an example, for an implementation using the protocol buffers API, Java access code may be generated with the protoc compiler using the command "Protoc-java_out=.<API definition file>."

C++ access code for the inter-process functions is generated from the API definition file 204 at block 208. The C++ access code is compiled at block 212. The compiled C++ access code is added to the C++ sub-system 220 and allows the sub-system to communicate data using functions in a C++ API library 222 and objects defined in the API definition file 204. As an example, for an implementation using the protocol buffers API, C++ access code may be generated with the protoc compiler using the command "Protoc-cpp_out=.<API definition file>."

An FFI definition file 232 for inter-process functions is generated at block 230. Wrapper code is generated from the FFI definition file to communicate data (e.g. serialized data) between the C++ and Java processes. For instance, as indicated above, SWIG may be used to generate an FFI that may be used to communicate serialized data. SWIG generates wrapper code for a non-C++ process to communicate data with C++ processes. Java FFI code is generated from the FFI definition file at block 234. Example 3 shows example FFI wrapper code that may be generated for the Java process by SWIG at block 234 to implement the FFI. The Java code is compiled at block 236 and linked with the Java sub-system 224 to facilitate communication between the C++ and Java sub-systems.

```
/* Copyright XILINX 2013*/
SWIGEXPORT jstring JNICALL Java_ui_data_fed_fed_i_RouteApi__1getRouteInfo(JNIEnv *jenv, jclass jcls, jlong jarg1, jstring jarg2) {
    jstring jresult=0;
    HFEDRouteGuiApi *arg1=(HFEDRouteGuiApi *) 0;
    HSTString *arg2=0;
    HSTString *result=0;
    (void)jenv;
    (void)jcls;
    arg1=*(HFEDRouteGuiApi **)&jarg1;
    arg2=NULL;
    if(!jarg2) {
        SWIG_JavaThrowException(jenv, SWIG_JavaNullPointerException, "null HSTString");
        return 0;
    }
    const jchar* arg2_jstr=jenv->GetStringChars(jarg2,0);
    if (!arg2_jstr) return 0;
    jsize arg2_len=jenv->GetStringLength(jarg2);
    std::wstring arg2_wstr;
    arg2_wstr.reserve(arg2_len);
    if (arg2_len) {
        for (jsize i=0; i<arg2_len; ++i)
            arg2_wstr.push_back((wchar_t)arg2_jstr[i]);
    }
    jenv->ReleaseStringChars(jarg2, arg2_jstr);
    HSTString arg2_str;
    HI18N::convert(arg2_wstr,arg2_str);
    arg2=&arg2_str;
    {
    try {
        result=(HSTString *) &(arg1)->getRouteInfo(*arg2);
    }
    catch (const HEXAll& exp) {
        HSTString messageStr;
        ComMsgMgrInstance
            *p_msgInst=exp.getMsgInstance( );
    if (p_msgInst) {
        messageStr=p_msgInst->getMessage( );
    }
        std::wstring wstr=HI18N::convert(messageStr);
        jsize wstr_len=wstr.length( );
        jchar* conv_buf=new jchar[wstr_len];
        std::copy(wstr.begin( ),wstr.end( ),conv_buf);
        jstring jstr=jenv->NewString(conv_buf,wstr_len);
        delete [ ] conv_buf;
        jclass clazz=jenv->FindClass("ui/frmwork/CommandFailedException");
        jmethod ID jid=jenv->GetMethodID(clazz,"<init>","(Ljava/lang/String;)V");
        jobject jobj=jenv->NewObject(clazz,jid,jstr);
        jenv->Throw((jthrowable)jobj);
        return 0;
    }
    catch (const std::bad_alloc& e) {
        //We are already out of memory, try not to allocate memory here
        jclass      clazz=jenv->FindClass("ui/formwork/COutOfMemoryException");
        jenv->ThrowNew(clazz, "Out of memory");
        return 0;
    }
    catch (const std::exception& e) {
        //Some std exception maybe from boost or other 3rd party code
        std::string str(e.what( ));
        std::wstring wstr=HI18N::convert(str);
        jsize wstr_len=wstr.length( );
        jchar* conv_buf=new jchar[wstr_len];
        std::copy(wstr.begin( ),wstr.end( ),conv_buf);
        jstring jstr=jenv->NewString(conv_buf,wstr_len);
        delete [ ] conv_buf;
        jclass clazz=jenv->FindClass("ui/frmwork/CommandFailedException");
        jmethod ID jid=jenv->GetMethodID(clazz,"<init>","(Ljava/lang/String;)V");
        jobject jobj=jenv->NewObject(clazz,jid,jstr);
        jenv->Throw((jthrowable)jobj);
        return 0;
    }
    catch ( . . . ) {
        //An unknown exception
```

```
        jclass clazz=jenv→FindClass("ui/frmwork/Command-
           FailedException");
        jenv→ThrowNew(clazz, "Unknown exception
           occurred");
        return 0;
      }
    }
    std::wstring result_wstr;
    HI18N::convert(*result,result_wstr);
    jsize result_len=result_wstr.length( );
    jchar *conv_buf=new jchar[result_len];
    std::copy(result_wstr.begin( ),result_wstr.end( ),con-
       v_buf);
    jresult=jenv→NewString(conv_buf, result_len);
    delete [ ] conv_buf;
    return jresult;
}
```

EXAMPLE 3

In addition to the serialization of sets of task requests described with reference to FIG. 1, in some implementations, serialization may be used to reduce the number of data transactions required to communicate data objects. For example, as indicated above, CAD tools communicate graphics modeling data from a graphics modeling process to a GUI process for each object in a circuit design. The graphical data is used by the GUI process to display a graphical representation of various views of a circuit design to a user. Due to the increasing complexity of circuit designs, the graphical data often must be communicated for a large number of objects in the circuit design. For instance, in some CAD tools graphical data for each element in a circuit design is communicated to the GUI using a separate respective data transaction.

Example 4 shows an example message that may be defined in a protocol buffer API definition file for communication between a GUI process and a graphics modeling process. As shown in Example 1, the message may be used to communicate requests for a GUI to provide information on specified elements of a circuit (e.g., nets); provide arrays of graphics modeling data to the GUI; or request modeling data for circuit elements matching circuit criterion (e.g., unrouted nets). This example is provided for illustrative purposes only. Data may be serialized in a number of alternative formats, depending on the API definition file.

```
/* Copyright XILINX 2013*/
//This is a bidirectional message for sending route informa-
tion between the GUI and //Engine.
message RouteData //COP {
   //GUI to Engine data
   repeated uint64 net_cptrs=1; //nets to get detail routing
      data on.
   repeated uint64 net_proxy_cptrs=2; //net proxies to get
      detail routing data on.
   repeated uint64 path_cptrs=3; //paths to get detail routing
      data on.
   repeated uint32 tile_tags=5; //tiles to get detail routing data
      on.
   repeated uint64 wire_instance_cptrs=6; //wire instances to
      get detail routing data on.
   repeated uint64 arc_instance_cptrs=7; //arc instances to
      get detail routing data on.
   repeated uint64 site_type_net_instance_cptrs=8; //site
      type net instances to get detail routing data on.
   repeated uint64 site_cptrs=9; //sites to get route data
   //Engine to GUI data (clear above arrays for the return trip
      back
   //to minimize data to send over SWIG)
   repeated TileWireResource tile_wire=11; //an array of tile
      wire resources
   repeated TileArcResource tile_arc=12; //an array of tile arc
      resources
   repeated SiteRouteResource site_route=13; //an array of
      site route resources
   repeated AbstractRouted abstract_routed=14; //an array of
      abstract routes
   optional PartiallyRoutedResource partially_routed=15;
      //an array of partially routed
   optional RouteResourceCount resource_count=16;
   repeated AbstractUnrouted abstract_unrouted=17; //an
      array of abstract unrouted;
   repeated UnroutedResource unrouted=18;
   //flags telling what data to return
   optional bool return_net_proxy_cptrs=19;
   optional bool return_fully_routed_nets=20
      [default=false];
   optional bool return_unrouted_nets=21 [default=false];
   optional bool return_routed_portion_of partially_routed_
      nets=22 [default=false];
   optional bool return_unrouted_portion_of partially_rout-
      ed_nets=23 [default=false];
   optional bool return_site_data=24 [default=true];
   optional bool return_abstract=25;
   optional bool return_center_tiles_for_abstract_routed=26
      [default=true];
   //When this flag is true, only data returned is the tile
      extrema.
   optional bool return_tile_extrema_only=27
      [default=false];
   optional bool return_stub_trimmed_wires=28
      [default=false];
   //return_routed_portion_of partially_routed_nets is don't
      care when this is true optional bool return_partial_con-
      flicts_only=29 [default=false];
}
```

EXAMPLE 4

Figure 3:
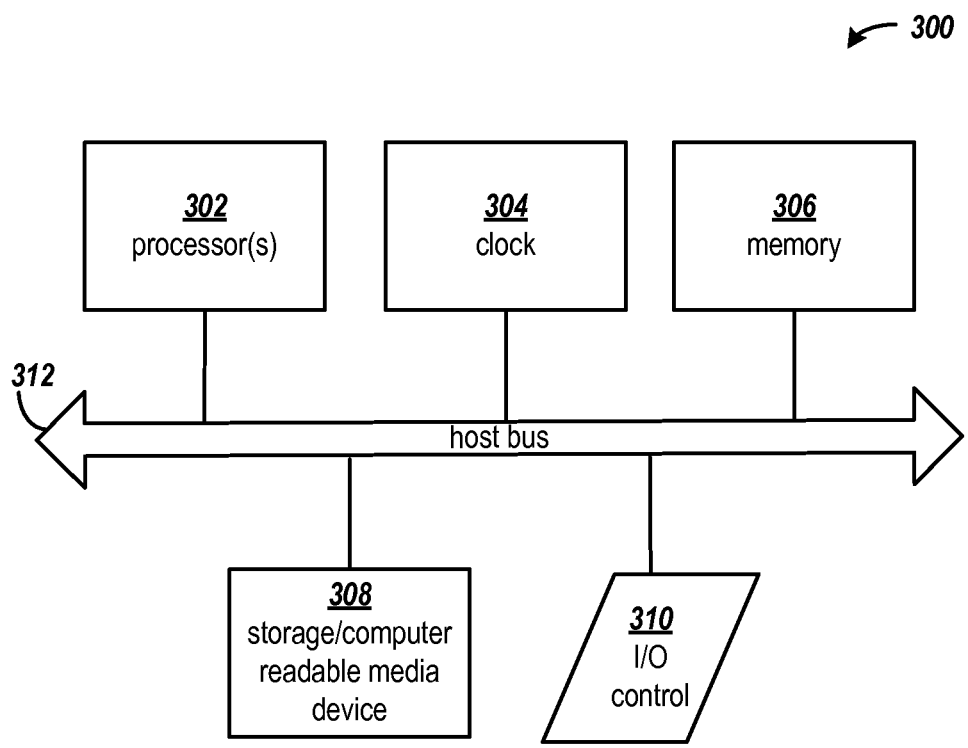
FIG. 3 shows a computing arrangement that may be configured to perform the processes disclosed herein.

FIG. 3 shows a block diagram of an example computing arrangement that may be configured to perform the processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 300 includes one or more processors 302, a clock signal generator 304, a memory arrangement 306, a storage arrangement 308, and an input/output control unit 310, all coupled to a host bus 312. The arrangement 300 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 302 may be one or more general-purpose processors, or a combination of one or more general purpose processors and suitable co-processors, or one or more specialized processors (e.g., RISC, CISC, pipelined, etc.).

The memory arrangement 306 typically includes multiple levels of cache memory, and a main memory. The storage arrangement 308 may include local and/or remote persistent storage, such as provided by magnetic disks (not shown), flash, EPROM, or other non-volatile data storage. The storage unit may be read or read/write capable. Further, the memory arrangement 306 and storage arrangement 308 may be combined in a single arrangement.

The processor(s) 302 executes the software in the storage arrangement 308 and/or memory arrangement 306, reads data from and stores data to the storage arrangement 308 and/or memory arrangement 306, and communicates with external devices through the input/output control arrangement 310. These functions are synchronized by the clock signal generator 304. The resource of the computing arrangement may be managed by either an operating system (not shown), or a hardware control unit (not shown).

The examples described herein are thought to be applicable to a variety of CAD systems (e.g., circuit design, mechanical design, and architecture). Other aspects and embodiments will be apparent to those skilled in the art from consideration of the specification. For instance, although examples may in some cases be described in individual figures, it will be appreciated that features from one figure can be combined with features of another figure even though the combination is not explicitly shown or explicitly described as a combination. The examples may be implemented as one or more processors configured to execute software, as an application specific integrated circuit (ASIC), or as a logic on a programmable logic device, for example. It is intended that the specification and the illustrated structures and methods be considered as examples only, with a true scope of the invention being indicated by the following claims.

What is claimed is:

1. A method, comprising:
   determining a set of inter-process functions of a first process and a second process, the set including one or more functions of the first and second processes that are accessible by the other one of the first and second processes;
   generating a first application program interface (API) definition file including a plurality of objects, each object defining a request to execute one or more inter-process functions of the set of inter-process functions;
   serializing by the first process on a programmed processor, in response to input indicating a plurality of inter-process functions of the set of inter-process functions, the plurality of inter-process functions according to the API definition file to provide a serialized set of functions;
   providing by a foreign function interface (FFI) process on the programmed processor, the serialized set of functions to the second process;
   deserializing by the second process on the programmed processor, the serialized set of functions according to the API definition file to retrieve the plurality of the set of inter-process functions; and
   executing the plurality of the set of inter-process functions by the second process on the programmed processor.

2. The method of claim 1, further comprising serializing by the second process on the programmed processor, data generated by the plurality of inter-process functions.

3. The method of claim 2, further comprising:
   providing the serialized data to the first process by the FFI process on the programmed processor; and
   deserializing the serialized data by the first process on the programmed processor.

4. The method of claim 1, further comprising:
   compiling a first code set in a first high-level programming language to produce a first program that, when executed by the programmed processor, causes the programmed processor to implement the first process; and
   compiling a second code set in a second high-level programming language to produce a second program that, when executed by the programmed processor, causes the programmed processor to implement the second process.

5. The method of claim 4, wherein:
   the first code set includes one or more functions of the FFI process; and
   the second code set includes one or more functions of the FFI process.

6. The method of claim 1, wherein the API definition file defines one or more protocol buffers.

7. The method of claim 1, wherein the first process comprises a graphical user interface (GUI).

8. The method of claim 7, wherein the second process comprises a graphics modeling process.

9. The method of claim 1, wherein at least one of the plurality of objects in the API definition file corresponds to a request to execute a plurality of the inter-process functions.

10. The method of claim 1, further comprising:
    serializing a set of data produced in the execution of the plurality of the set of inter-process functions according to the API definition file to produce a serialized set of data;
    providing by a foreign function interface (FFI) process on the programmed processor, the serialized set of data from the second process to the first process; and
    deserializing the serialized set of data by the first process.

11. A system, comprising:
    a processor configured to:
        determine a set of inter-process functions of a first process and a second process, the set including one or more functions of the first and second processes that are accessible by the other one of the first and second processes, the first process written in a first high-level programming language and the second process written in a second high-level programming language;
        generate a first application program interface (API) definition file including a plurality of objects, each object defining a request to execute one or more of the set of inter-process functions;
        use the first process on the processor, in response to input indicating a plurality of the set of inter-process functions, serialize the plurality of the set of inter-process functions according to the API definition file to provide a serialized set of functions;
        use a foreign function interface (FFI) process on the processor to provide the serialized set of functions to the second process; and
        use the second process on the programmed processor to:
            deserialize the serialized set of functions according to the API definition file to retrieve the plurality of the set of inter-process functions; and
            execute the plurality of the set of inter-process functions.

12. The system of claim 11, wherein the processor is further configured to use the second process to serialize data generated by the plurality of inter-process functions.

13. The system of claim 12, wherein the processor is further configured to:

use the FFI process to provide the serialized data of the second process to the first process; and use the first process to deserialize the serialized data.

14. The system of claim 11, wherein the FFI includes:

a first code set written in the first high-level programming language; and a second code set written in the second high-level programming language.

15. The system of claim 11, wherein the API definition file defines one or more protocol buffers.

16. The system of claim 11, wherein at least one of the plurality of objects in the API definition file corresponds to a request to execute a plurality of the set of inter-process functions.

17. The system of claim 11, wherein the first process comprises a graphical user interface (GUI).

18. The system of claim 17, wherein the second process comprises a graphics modeling process.

19. The system of claim 11, wherein the processor is further configured to:

use the second process on the processor to serialize a set of data produced in the execution of the plurality of the set of inter-process functions according to the API definition file to produce a serialized set of data;

use a foreign function interface (FFI) process on the processor to provide the serialized set of data from the second process to the first process; and use the second process on the processor to deserialize the serialized set of data.

* * * * *